Figure 1:
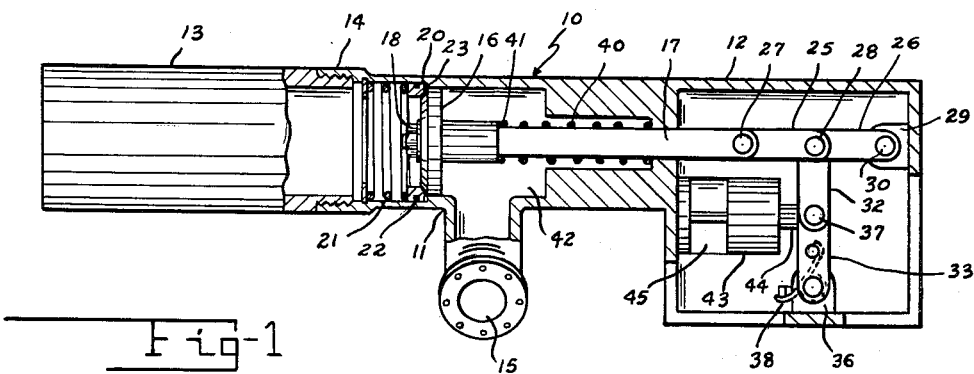

July 2, 1963 V. H. LARSON ETAL 3,095,901
RAPID OPENING VALVE
Filed March 16, 1962

INVENTORS
VINCENT H. LARSON
ROBERT D. HOLMBERG
BY
ATTORNEY
AGENT

3,095,901
RAPID OPENING VALVE
Vincent H. Larson, Minneapolis, and Robert D. Holmberg, Mound, Minn., assignors to the United States of America as represented by the Secretary of the Air Force
Filed Mar. 16, 1962, Ser. No. 180,368
2 Claims. (Cl. 137—522)

This invention relates to a rapid opening valve of the poppet type.

One object of the invention is to provide a valve which will be wide open in a very few milliseconds after the restraining force has been released.

A further object of the invention is to provide means for bringing the moving parts of the valve to rest after its operation.

A still further object is to provide a valve which will return to its closed position when the inlet and outlet pressures have become equalized.

Figure 2:
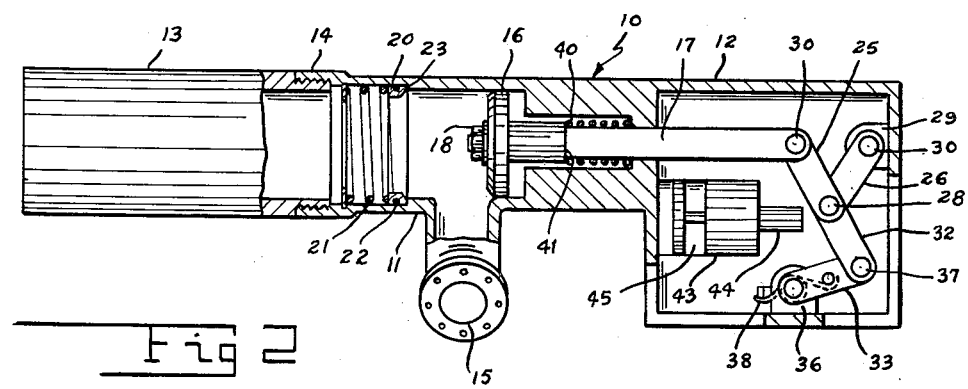

These and other objects will be more fully understood from the following detailed description taken with the drawing wherein:

FIG. 1 is a schematic of a rapid opening valve according to this invention; and, FIG. 2 is a schematic of the valve of FIG. 1 in its open position.

The valve of this invention is for the purpose of providing the rapid release of fluids, including gases, vapors and liquids, which are held under pressure within a container.

The valve when in its closed position has the piston held in contact with the valve seat by a mechanical linkage or other means so as to prevent flow or leakage of the pressurized fluid. To open the valve a restraining force is removed so that the pressure within the container will act to open the valve very rapidly. The valve will be in its wide open position in a very few milliseconds after the restraining force is released. A dash pot is provided to bring the moving parts to rest after the firing of the valve. A spring, air piston, or other arrangement, is used to return the valve to its closed position.

Referring more particularly to FIGS. 1 and 2 of the drawing, which show a valve 10 having a valve assembly housing 11 and a valve operating mechanism housing 12, the valve 10 is sealed to a pressurized chamber 13 by means of a screw fit 14 or other means. A valve piston 16 located within the valve assembly housing 11 is connected to a valve piston rod 17 by means of a nut 18 threaded on to the piston rod 17. The valve piston fits against the floating valve seat 20 when the piston is in its closed position. The valve seat 20 is held in engagement with the valve piston 16 by means of a spring 21. A seal 22 is provided between floating valve seat 20 and the valve assembly housing 11. A valve seat stop 23 is provided to limit the movement of the valve seat when the valve piston is in its open position. The valve piston 16 is held in its closed position by means of a two-bar linkage having operating arms 25 and 26 connected between the piston rod 17 and a pivot support 29. The two-bar linkage is connected to the piston rod 17 at pivotable support 27 and to the pivot support 29 by a pivot 30. A second two-bar linkage having operating arms 32 and 33 is connected between pivotable connection 28 and pivot support 36. The operating arms 32 and 33 of the second two-bar linkage are connected by means of a pivotable connection 37. A spring 38 is connected between the arm 33 and the support 36 for returning the second linkage to its in-line position when the valve piston is in its closed position. A spring 40 is provided between shoulder 41 and housing 11 for returning the valve piston into engagement with the valve seat after the pressure is equalized between the outlet port 15 and the pressure in the inlet to the valve from pressurized vessel 13. A dash pot 42 is provided for decelerating and stopping the motion of piston 16 after the valve has been operated. A solenoid valve shown schematically at 43, having an operating plunger 44, is located within the valve operating assembly housing 11. The plunger 44 is connected in line with the pivot 37. A dash pot 45 is provided to slow down and stop the operating plunger 44 after the solenoid has been operated.

In the operation of the device, solenoid valve 43 is operated so that the plunger 44 pushes operating arms 32 and 33 out of their in-line position. This, in turn, pulls the pivotable connection 28 and thus pulls the operating arms 25 and 26 out of their in-line position. As soon as the operating arms 25 and 26 have been pulled out of their in-line position, the pressure in vessel 13 operating against the piston 16 rapidly opens the valve since there is no longer any restraining force operating against the valve piston rod 17. After operation of the valve, the valve assembly is slowed down and stopped by means of the fluid which has collected within the dash pot 42. Floating seat 20 will come to rest against stop 23. After the valve inlet pressure from vessel 13 and the pressure in outlet 15 have equalized, there is nothing that holds the piston 16 open. Springs 38 and 40 then operate to return the valve piston and linkage to their normal closed position.

Floating seal 20 makes the need for very precise adjustment of the linkage and valve stem unnecessary and compensates for deflection of parts when the piston is subjected to the pressure of the fluid in the chamber 13.

There is thus provided a rapid opening valve which will open a few milliseconds after the restraining force has been released and which will return to its closed position when the pressures in the inlet and outlet have been equalized.

While certain specific embodiments have been described in detail, it is obvious that numerous changes may be made without departing from the general principle and scope of the invention.

We claim:

1. A rapid opening valve for releasing a fluent material under pressure within a container at a controllable time comprising: a valve housing having an inlet port and an outlet port; said inlet port being sealed to said container; a floating valve seat within said housing; a valve piston supported in sealing relation with said valve seat; a piston rod connected to said piston; a first pivot support within said valve housing; a first two-bar linkage connected between said piston rod and said first pivot support; a second pivot support within said valve housing; means, including a second two-bar linkage connected between said first two-bar linkage and said second pivot support, for holding said first two-bar linkage, said piston rod and said first pivot support in an in-line relation, to thereby lock said piston against said valve seat; means connected between said second two-bar linkage and said second pivot support for normally holding said second two-bar linkage, said second pivot support and the connecting point of said first and second two-bar linkages in in-line relation; a solenoid operated means for moving said second two-bar linkage out of its in-line relation to thereby move the first two-bar linkage out of its in-line relation to permit rapid opening of said valve in response to the pressure of the fluent material within said container; said second two-bar linkage being free to move independently of said solenoid operated means; means for decelerating and stopping said valve piston and means for reclosing the valve when the inlet and outlet pressures are equalized.

2. A rapid opening valve for releasing a fluent material under pressure within a container at a controllable time comprising: a valve housing having an inlet port and an outlet port; said inlet port being sealed to said container; a floating valve seat within said housing; a valve piston supported in sealing relation with said valve seat; a piston rod connected to said piston; a first pivot support within said valve housing; a first two-bar linkage including a pivotable interconnection connected between said piston rod and said first pivot support; a second pivot support within said valve housing; means, including a second two-bar linkage including a pivotable interconnection connected between said pivotable interconnection of said first two-bar linkage and said second pivot support, for holding said first two-bar linkage, said piston rod and said first pivot support in an in-line relation, to thereby lock said piston against said valve seat; means connected between said second two-bar linkage and said second pivot support for normally holding said second two-bar linkage, said second pivot support and said pivotable interconnection of said first two-bar linkage in in-line relation; a plunger located in abutting relation to said pivotable interconnection of said second two-bar linkage; a solenoid operated means for actuating said plunger to move said second two-bar linkage out of its in-line relation to thereby move the first two-bar linkage out of its in-line relation to permit rapid opening of said valve in response to the pressure of the fluent material within said container; means for decelerating and stopping said valve piston and spring means between said valve piston and said valve housing for reclosing the valve when the inlet and outlet pressures are equalized.

References Cited in the file of this patent

UNITED STATES PATENTS

| | | |
|---|---|---|
| 1,836,813 | Rankin | Dec. 15, 1931 |
| 2,323,021 | Ernst | June 29, 1943 |
| 2,973,776 | Allen | Mar. 7, 1961 |
| 2,973,777 | Troxell | Mar. 7, 1961 |

FOREIGN PATENTS

| | | |
|---|---|---|
| 314,989 | Switzerland | Aug. 31, 1956 |